United States Patent Office 2,733,263
Patented Jan. 31, 1956

2,733,263

PREPARATION OF MAHOGANY ACID CONCENTRATES

George Riethof and George P. Brown, Jr., Pittsburgh, Pa., assignors to Gulf Research & Development Company, Pittsburgh, Pa., a corporation of Delaware No Drawing. Application December 30, 1950,
Serial No. 203,802

8 Claims. (Cl. 260—504)

This invention relates to the preparation of mahogany acid concentrates in oil solution, and in particular to oil solutions of mahogany acid concentrates which can be readily neutralized to form salts.

It is well known that when lubricating distillates are treated with a sulfonating agent such as fuming or concentrated sulfuric acid, considerable quantities of oil-soluble sulfonic acids are formed. These so-called mahogany acids and their salts are becoming increasingly important because of their many commercial applications. Mahogany acid concentrates are used in the preparation of extreme pressure agents, oil-soluble dyes, insecticides, dispersing agents, wetting agents, emulsifying agents, and detergents. This invention is concerned with a novel method for preparing mahogany acid concentrates in oil.

Heavy oils, when sulfonated, have a high mahogany acid content and therefore would be an excellent source of mahogany acid concentrates. However, it is known that such high viscosity oils when sulfonated are very difficult to treat chemically. They are ordinarily unsatisfactory because the resulting sulfonated oil forms a stable emulsion and produces slime when it is neutralized in the conventional manner with bases which form oil-soluble salts. Consequently, high viscosity oils are not ordinarily sulfonated for the production of mahogany acid concentrates. By this invention mahogany acid concentrates which can be readily neutralized can be prepared from high viscosity oils.

The treatment of higher fractions of petroleum with a sulfonating agent such as fuming or concentrated sulfuric acid yields not only mahogany acids but water-soluble acids called green acids. When a lubricating oil fraction is sulfonated, two layers are formed. In some cases, depending mainly on the nature of the oil used, and on the relative amount of sulfonating agent employed, a comparatively small third layer may appear in the lowest portion of the settling vessel. This layer comprises spent sulfuric acid and some sulfonic acids. The top layer is an oil layer containing oil-soluble sulfonic acids and is called the (mahogany) acid oil layer. The next lower layer, which in some instances will be a middle layer, comprises mainly water-soluble sulfonic acids and is called the green acid layer. The green acid layer usually contains some sulfuric acid, a considerable amount of the so-called green acids, some entrained oil, and some oil-soluble sulfonic acids. This invention is primarily concerned with the green acid layer.

We have discovered in accordance with this invention that mahogany acid concentrates can be prepared efficiently by extracting a green acid layer with a mineral lubricating oil containing a smal amount of mahogany acids in solution, as indicated by a low neutralization number. The presence in the mineral oil of a small amount of mahogany acids appears to increase substantially the ability of the oil to take up oil-soluble sulfonic acids from the green acid layer. It should be noted that green acid layers vary depending upon the sulfonation treatment and upon the nature of the oil which is sulfonated, in other words, on the amount of sulfuric acid used or on whether the oil employed is naphthenic, etc. Consequently the amount of oil used as the extractant will vary in each case. However, in general the amount of extractant oil employed will depend upon the neutralization number of said oil extractant and upon the desired end use of the concentrate. Thus when the neutralization number is less than 5 a small amount of oil will be used in the extraction, and relatively more concentrated solutions will result. For example when the neutralization number is around 2 as little as 30 to 50 weight per cent or less of the oil can be used based on the weight of the green acid layer. Ordinarily the neutralization number indicating the amount of mahogany acids present, need not be greater than about 5. When the neutralization number of the extractant is around 5, at least 100 weight weight per cent of the mineral lubricating oil based on the weight of the green acid layer should be used as the extractant. When the neutralizing number is greater than 5, correspondingly larger amounts above 100 weight per cent of the oil solution should be employed in the extraction of the green acid layer. In other words a larger amount of said extractant oil which has a higher neutralization number is employed.

In carrying out our invention the green acid layer may be extracted with a mineral lubricating oil which has been partially sulfonated so as to contain a small amount of mahogany acids. This partially sulfonated mineral oil should have a low neutralization number, generally less than 5. Another oil which we prefer to use which contains a small amount of mahogany acids is a mineral lubricating oil which has been previously used for the second extraction of a similar green acid layer. This oil will usually have a neutralization number around 2. Obviously oils having low neutralization numbers, say around 2, can be obtained in a number of ways known to those skilled in the art, such as dilution of an acid oil and the like. Our invention is primarily concerned with their use in extracting green acid layers to obtain concentrated solutions of oil-soluble sulfonic acids.

In carrying out one embodiment of our invention an oil is sulfonated and the two layers, and any spent acid layer if present, are separated by known means. The green acid layer from sulfonation is then mixed with a mineral lubricating oil. If desired the spent acid layer may be mixed, together with the green acid layer, with the extractant oil solution. In some cases it appears to be advantageous to extract both the green acid layer and the spent acid layer. After the mixture has been agitated it is allowed to stand so that stratification can take place. The layers formed are then separated as before and the oil layer is found to contain a high percentage of sulfonic acids as indicated by a high neutralization number. If the mineral lubricating oil used in this extraction is a low viscosity oil it can be mixed with the original acid oil to yield an oil which can be readily neutralized. This is advantageous when the oil originally sulfonated is a high viscosity oil.

The green acid layer resulting from this first extraction step may then be treated with another quantity of mineral oil and extracted as before. This extractant will usually have a low neutralization number. We have found that if this oil, which has been used for the second extraction, is then used in the extraction of a previously unextracted green acid layer, it is much more effective than a fresh lubricating oil. Unexpectedly large quantities of mahogany acids can be extracted from the green acid layer with such oils. Unexpectedly large amounts of mahogany acids can also be extracted from the green acid layer by the use of a partially sulfonated oil containing a small quantity of mahogany acids as indicated by its low neutralization number. Consequently this process is of vital importance in the preparation of mahogany acid concentrates.

It has been pointed out that in the preparation of detergent oils or detergent concentrates it is desired to produce concentrates of the basic salt of sulfonic acids. However, these salts are especially troublesome to prepare in solutions obtained by the sulfonation of high viscosity oils. Consequently such high viscosity oils, which are incapable of producing high yields of mahogany acids, are generally not sulfonated commercially. We have discovered that it is possible to sulfonate high viscosity lubricating stocks and to convert such solutions to metal sulfonates without any difficulty. In this instance the green acid layer resulting from the sulfonation of the high viscosity oil, or, in fact, any green acid layer, is extracted with a low viscosity oil. When the resulting extract is blended in the desired ratio with the original high viscosity acid oil, a concentrate is obtained which can be readily neutralized with a base, such as a metal hydroxide or carbonate, which forms oil-soluble salts.

The extraction of green acid layers with mineral oils containing small amounts of mahogany acids may be carried out at various temperatures. We have found that when elevated temperatures, usually around 60° C. are employed, as compared to lower temperatures, an increase in the yield of extracted mahogany acids is obtained. Consequently, temperatures which should be employed vary from room temperatures to the incipient decomposition temperature of the mahogany acids present, usually around 70° or 80° C.

Our invention may be more easily understood by reference to the following examples. The oils used in these examples were solvent refined oils. However, the invention is adaptable to any mineral oil in the lubricating oil range and to any mineral lubricating oil extractant. It is emphasized that modifications and variations will obviously occur to one skilled in the art. Consequently, examples herein are merely illustrative.

*Example I*

In this example 1200 grams of a Mid-Continent base solvent refined stock having a viscosity of 453 SUS at 100° F. were sulfonated with 300 grams of fuming sulfuric acid (20% $SO_3$). The green acid layer weighed 540 grams while the mahogany acid layer weighed 856.5 grams. The yield was 71.4 weight per cent while the neutralization number was 16.6. In terms of total amounts of sulfonic acids this corresponds to a total neutralization number (grams of oil×neutralization number of oil) of 14226.

*Example II*

An aliquot, namely 50 grams, of the green acid layer obtained according to Example I was mixed with 200 weight per cent of a Mid-Continent base solvent refined oil at room temperature while stirring. The oil employed had a viscosity of 453 SUS at 100° F. After about one-half hour, stirring was stopped and the mixture was allowed to stratify. The oil layer and the extracted green acid layer were separated and, based on the extraction of the total green acid layer (540 grams) from Example I, the yields were: an oil layer of 1177 grams; or 109 weight per cent; and an extracted green acid layer of 440 grams. The neutralization number of the extractant oil was 4.3 In terms of total amount of sulfonic acids this corresponds to a total neutralization number (grams of oil ×neutralization number of oil) of 5061.

*Example III*

An aliquot, namely 50 grams, of the green acid layer obtained according to Example I was mixed with 200 weight per cent of a Mid-Continent base solvent refined oil at 60° C. while stirring. The oil used had a viscosity of 453 SUS at 100° F. After about one-half hour, stirring was stopped and the mixture was allowed to stratify. The extractant oil layer and the extracted green acid layer were separated and, based on the extraction of the total green acid layer (540 grams) from Example I, the yields were: an oil layer of 1231 grams, or 114 weight per cent; and an extracted green acid layer of 383 grams. The neutralization number of the extractant oil was 6.9. In terms of total amount of sulfonic acids, this corresponds to a total neutralization number (grams of oil×neutralization number of oil) of 8394.

Examples II and III above illustrate that extraction at elevated temperatures gives better results than at room temperature. Both the yield and the neutralization number are higher when the extraction is carried out at 60° C. The yield in extraction is usually higher than 100 per cent because both oil and oil-soluble acids are extracted from the acid layer. Some oil from the original sulfonation step stays in the green acid layer in spite of a settling time of as much as 20 hours.

Since it is apparently impossible to remove all of the oil and the mahogany acids from the green acid layer by one extraction, it has been found advantageous to perform a second extraction on the previously extracted green acid layer as in Examples IV and V below. The extractant oil from this second extraction can then be used to advantage in extracting a fresh green acid layer as shown in Examples VI and VII below.

*Example IV*

An aliquot of a green acid layer previously extracted as described in Example II was again extracted, this time by mixing with 200 weight per cent of a Mid-Continent base solvent refined oil at room temperature while stirring. The oil employed had a viscosity of 453 SUS at 100° F. After about one-half hour, stirring was stopped and the mixture was allowed to stratify. The extractant oil layer and the extracted green acid layer were separated and, based on the extraction of the total green acid layer from Example II (440 grams), the yield was an oil layer of 1155 grams, or 107 weight per cent, The neutralization number of the extractant oil was 2.0. In terms of total amount of sulfonic acids this corresponds to a total neutralization number (grams of oil × neutralization number of oil) of 2310.

It is noted that if the oil extractants from Examples II and IV are mixed, the total neutralization number of the extraction is 7371.

*Example V*

An aliquot of a green acid layer previously extracted as described in Example III was mixed with 200 weight per cent of a Mid-Continent base solvent refined oil at 60° C. while stirring. The oil used had a viscosity of 453 SUS at 100° F. After about one-half hour, stirring was stopped and the mixture was allowed to stratify. The extractant oil layer and the extracted green acid layer were separated and, based on the extraction of the total green acid layer from Example III (383 grams), the yield was an oil layer of 1155 grams, or 107 weight per cent. The neutralization number of the extractant oil was 1.9. In terms of total amount of sulfonic acids, this corresponds to a total neutralization number (grams of oil × neutralization number of oil) at 2196.

It is noted that if the oil extractants from Examples III and V are mixed, the total neutralization number of the extraction is 10590.

*Example VI*

A green acid layer was obtained as in Example I, and separated into aliquot parts weighing 140.8 grams. One of these aliquot parts was extracted with 140.8 grams of a solvent refined Gulf Coastal oil (SUS 453 at 100° F.) according to the above examples. The resulting neutralization number was 17.6. The other aliquot part of the green acid layer (140.8 grams) was extracted with 140.8 grams of a solvent refined Gulf Coastal oil (755 SUS at 100° F.) which had been previously used in a second extraction step and which had a neutralization number of 2.5. After the green acid was extracted according to the above examples, the neutralization number of the resulting oil extractant was 24.0. Hence the neutralization number obtained with an oil containing no mahogany acids was 17.6 while the neutralization number obtained with the oil previously used for the second extraction of a similar green acid layer was 24.0. The neutralization number to be expected when the green acid was extracted with an oil having a neutralization number of 2.5 was only 20.1. By performing the extraction with an oil containing a small amount of mahogany acids, better results are obtained as indicated by a neutralization number of 24.0 instead of 20.1.

*Example VII*

A green acid layer was obtained as in Example I, and separated into aliquot parts weighing 144.9 grams. One of these aliquot parts was extracted with 144.9 grams of a solvent refined Gulf Coastal oil (453 SUS at 100° F.) according to the above examples. The resulting neutralization number was 17.3. The other aliquot part of the green acid layer (144.9 grams) was extracted with 144.9 grams of a solvent refined Gulf Coastal oil (755 SUS at 100° F.) which had been previously used in a second extraction step and which had a neutralization number of 2.5. After the green acid was extracted according to the above examples, the neutralization number of the resulting oil extractant was 23.4. Hence the neutralization number obtained with an oil containing no mahogany acids was 17.3 while the neutralization number obtained with the oil previously used for the second extraction of a similar green acid layer was 23.4. The neutralization number to be expected when the green acid was extracted with an oil having a neutralization number of 2.5 was only 19.8. By performing the extraction with an oil containing a small amount of mahogany acids, better results are obtained as indicated by a neutralization number of 23.4 instead of 19.8.

The above examples illustrate that mahogany acid concentrates can be prepared conveniently and economically in accordance with the present invention. It is apparent that there are many variations of the present invention which can be employed to prepare mahogany acid concentrates. For instance we have found that a green acid layer can be extracted with a low viscosity oil containing a small amount of sulfonic acids in solution, and this extract can be blended with a high viscosity sulfonated oil to lower the viscosity of said oil, thereby obtaining a blend of mahogany acids having substantially the same concentration. In fact, usually the neutralization number is substantially increased by blending the two oils. By this method a mahogany acid concentrate which can be neutralized without difficulty due to emulsions can be prepared from a high viscosity oil. By this invention mahogany acid concentrates can be prepared with oils which are difficult to sulfonate by using these oils as extractants. Our process also has a number of advantages over conventional sulfonation processes. The over-all yield of oil-soluble sulfonic acids from a given amount of oil sulfonated is increased considerably by our invention. In some instances, the yield can be doubled. It is possible by this method to incorporate into a high viscosity index lubricating oil an appreciable amount of oil-soluble sulfonic acids without adding thereto any appreciable amount of undesirable low viscosity index oil such as is usually encountered in mahogany acid solutions. For example, if one desired to prepare a 100 viscosity index lubricating oil solution of mahogany acids or salts thereof, a 100 viscosity index lubricating oil would be used in the extraction of one or more green acid layers. The amount of low viscosity index lubricating oil entering the high viscosity index oil would be relatively small, corresponding only to the amount of oil entrained in the green acid layer or layers. In addition, the results obtained by preparing mahogany acid concentrates according to the instant invention are much superior to present commercial methods. It should be mentioned that the oil having a low neutralization number could have been obtained by extracting a green acid layer which was previously extracted even more than two times to remove substantially all of the mahogany acids. However, these and other modifications will obviously occur to one skilled in the art.

We claim:

1. A process for preparing mahogany acid concentrates which comprises extracting mahogany acids from a green acid layer of a sulfonated mineral lubricating oil with a mineral lubricating oil containing a small amount of mahogany acids in solution as indicated by a neutralization number not greater than about 5.

2. A process for preparing mahogany acid concentrates which comprises extracting mahogany acids from a green acid layer of a sulfonated mineral lubricating oil with a mineral lubricating oil, said last-mentioned oil having been partially sulfonated as indicated by a neutralization number not greater than about 5.

3. A process for preparing mahogany acid concentrates which comprises extracting mahogany acids from a green acid layer of a sulfonated mineral lubricating oil with a mineral lubricating oil, said last-mentioned oil having been previously used for the second extraction of a similar green acid layer and having a neutralization number not greater than about 5.

4. A process for preparing mahogany acid concentrates which comprises extracting a green acid layer of a sulfonated mineral lubricating oil with a mineral lubricating oil to remove substantially all of the oil-soluble acids from said acid layer, extracting the resulting green acid layer with a second mineral lubricating oil to remove the remaining acids, using said second oil extractant to extract a previously unextracted green acid layer of a sulfonated mineral lubricating oil and subsequently mixing said second oil with an original mahogany acid layer.

5. A process for preparing mahogany acid concentrates which comprises extracting a green acid layer of a sulfonated mineral lubricating oil with a mineral lubricating oil to remove substantially all of the oil-soluble acids from said acid layer, extracting the resulting green acid layer with a second mineral lubricating oil to remove the remaining acids and produce a second oil extractant containing mahogany acids but having a neutralization number not greater than about 5, using said second oil extractant to extract a previously unextracted green acid layer of a sulfonated mineral lubricating oil, and subsequently mixing the two extracts with an original mahogany acid layer.

6. A process for preparing mahogany acid concentrates which comprises extracting a green acid layer of a sulfonated mineral lubricating oil with a low viscosity mineral lubricating oil to remove substantially all of the oil-soluble acids from said acid layer, extracting the resulting green acid layer with a second low viscosity mineral lubricating oil to remove the remaining acids and produce a second oil extractant containing mahogany acids but having a neutralization number not greater than about 5, using said second oil extractant to extract a previously unextracted green acid layer of a sulfonated mineral lubricating oil, and subsequently mixing the two low viscosity extracts with an original high viscosity mahogany acid layer.

7. A method for preparing salts of mahogany acid concentrates from a sulfonated high viscosity oil which comprises separating the oil layer and the green acid layer resulting from the sulfonation step, extracting mahogany acids from the green acid layer with a low viscosity lubricating oil, blending the low viscosity oil thus obtained with the original high viscosity oil layer to form a mahogany acid concentrate, and neutralizing the resulting concentrate.

8. A method for preparing salts of mahogany acid concentrates from sulfonated high viscosity oils which comprises separating the oil layer and the green acid layer resulting from sulfonation steps, extracting mahogany acids from the green acid layer with a low viscosity lubricating oil at an elevated temperature below the incipient decomposition temperature of the sulfonic acids, blending the low viscosity extract with the high viscosity oil layer to form a mahogany acid concentrate, and neutralizing the resulting concentrate.

References Cited in the file of this patent

UNITED STATES PATENTS

| | | |
|---|---|---|
| 1,087,888 | Petroff | Feb. 17, 1914 |
| 1,211,923 | Dennis | Jan. 9, 1917 |
| 1,319,027 | Divine | Oct. 14, 1919 |
| 1,474,933 | Humphrey et al. | Nov. 20, 1923 |
| 1,673,045 | Gray | June 12, 1928 |
| 1,935,666 | Ramayya | Nov. 21, 1933 |
| 2,081,719 | Van Dijck | May 25, 1937 |
| 2,158,680 | Retalillau | May 16, 1939 |
| 2,456,119 | Friedman et al. | Dec. 14, 1948 |
| 2,470,896 | Mavity | May 24, 1949 |